April 21, 1936.    H. MATHA    2,037,863
LIGHTING SYSTEM FOR AUTOMOBILE VEHICLES
Filed May 22, 1935    2 Sheets-Sheet 2
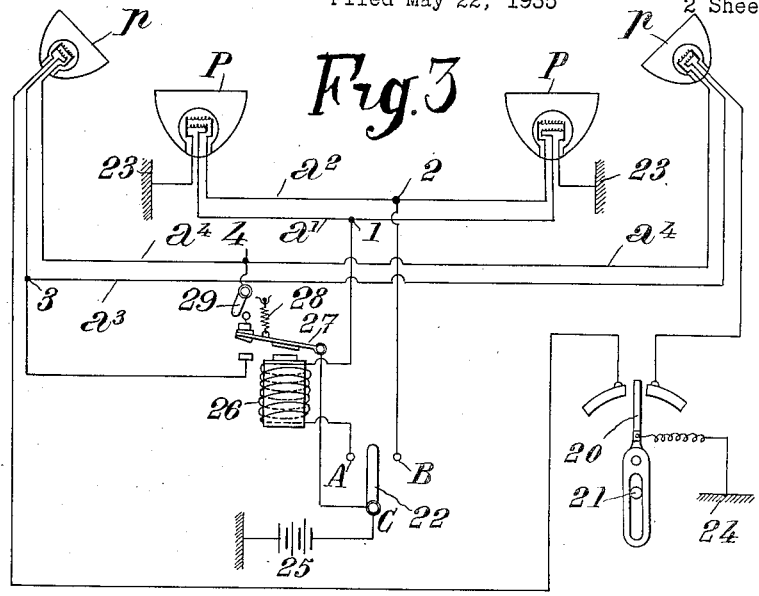
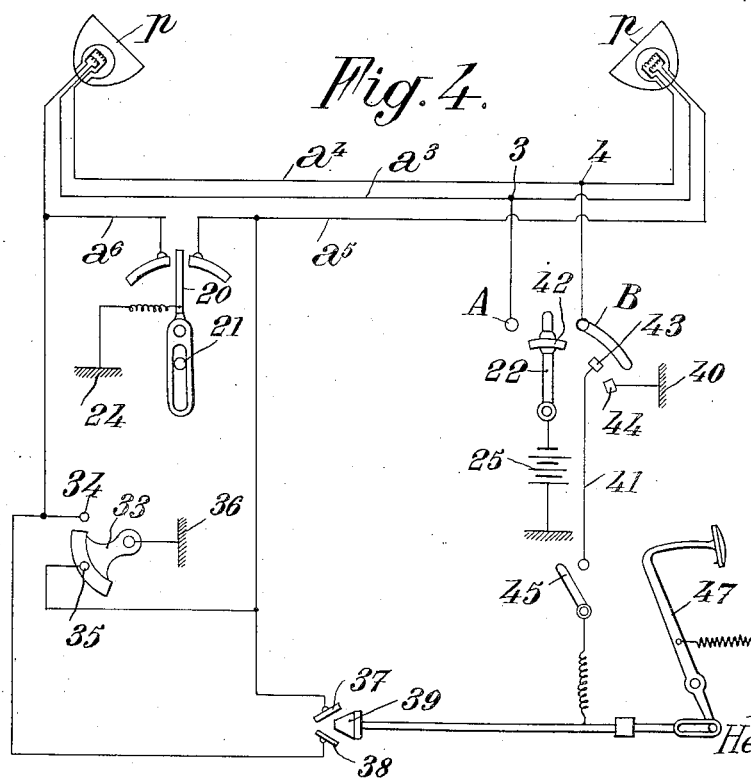
Inventor:
Henri Matha
Attorneys:

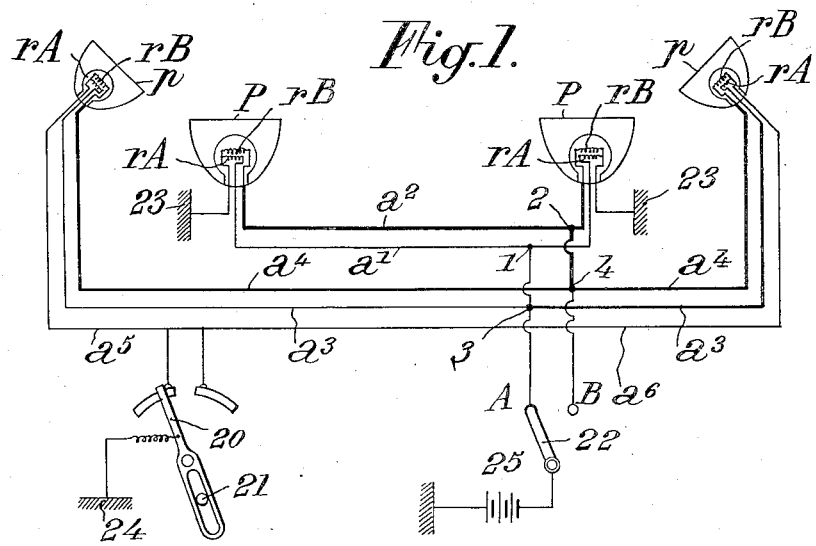
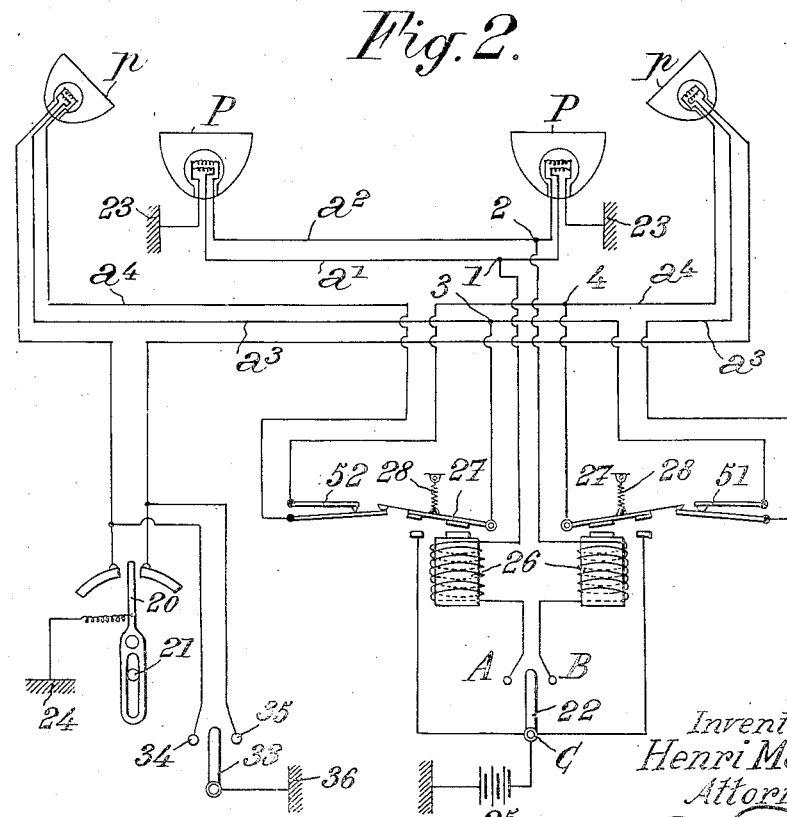

Patented Apr. 21, 1936

2,037,863

UNITED STATES PATENT OFFICE 2,037,863

LIGHTING SYSTEM FOR AUTOMOBILE VEHICLES

Henri Matha, Algiers, Algeria

Application May 22, 1935, Serial No. 22,827
In Belgium November 15, 1934

10 Claims. (Cl. 171—97)

The present invention relates to lighting systems for automobile vehicles and especially to lighting systems for illuminating the path of the vehicle when turning corners.

The object of the present invention is to provide an electric system of this kind which is better adapted to meet the requirements of actual practice than systems of the same kind used up to the present time.

According to an essential feature of the present invention, in a lighting system including, in combination with at least one ordinary headlamp, two auxiliary headlamps adapted to be utilized when turning a corner, each of these lamps including two filaments for giving different illuminations, and a switch for feeding electric current to either of the two filaments of each lamp, I provide means for preventing electric current flowing through one of the circuits connected with the filaments that are to be supplied with current from flowing into another circuit corresponding to a filament that should not receive electric current.

According to another feature of the present invention, I make use of relays, energized by the current flowing through some of the circuits of the lighting system, for breaking the circuits through which current must not flow.

Another feature of the invention consists in providing means for automatically switching on at least one auxiliary headlamp when the vehicle slows down, especially before turning, for instance in response to an upward movement of the throttle pedal.

Still another feature of the invention consists, in systems including two auxiliary headlamps, in arranging the system in such manner that the switching on of the auxiliary headlamps may be effected manually, through a switch which also controls, simultaneously, the device for indicating the direction in which the vehicle is going to turn.

Other features of the present invention will result from the following detailed description of some specific embodiments thereof.

Preferred embodiments of the present invention will be hereinafter described, with reference to the accompanying drawings, given merely by way of example, and in which:

Fig. 1 is a diagram showing the electric lighting system of an automobile vehicle including two ordinary or main headlamps and two auxiliary headlamps, this system being of a known type and being intended, by comparison with the diagrams of the other figures, to facilitate a good understanding of the invention;

Fig. 2 is a similar diagram showing a system according to the present invention;

Fig. 3 is a view similar to Fig. 2, showing a modification;

Fig. 4 is a diagram of a lighting system including two auxiliary headlamps for illuminating the road when the vehicle is negotiating a curve, this lighting system being made according to the present invention.

In the following description, I will consider the case of a vehicle provided with two main head lamps P disposed in the usual manner and two auxiliary headlamps more especially intended to illuminate the road when the vehicle is negotiating a curve, the axes of these last mentioned headlamps being disposed obliquely with respect to the longitudinal axis of the vehicle.

It is already known to arrange the lighting system in such manner that, when the vehicle is negotiating a curve, one of the two auxiliary headlamps $p$ (the one that projects the light beam toward the inside of the curve) can be switched on separately, for instance automatically through a switch 20 operated by the displacement of a member 21 of the steering gear of the vehicle.

It is particularly advantageous, as will first be supposed in what follows, to provide two different illuminations for the auxiliary headlamps as well as for the main headlamps, for instance by making use, for this purpose, of lamps having two filaments $rA$ and $rB$, the switching from one kind of illumination to the other kind being effected, on the instruments board, through a single switch 22 coacting with two contacts A and B which correspond to the two kinds of illumination, respectively.

The systems employed up to the present time did not meet the requirements of practice, since, because of interconnections existing between the circuits of headlamps P and those of headlamps $p$, it happened that, for each particular combination of lighting, important shunt currents passed through filaments which, for this combination, should not have been fed with current.

This is visible in Fig. 2, which corresponds to a known system. In this lighting system, current is distributed, on the one hand, to headlamps P at points 1 and 2, through wires $s^1$ and $s^2$, and on the other hand to head-lamps $p$, at points 3 and 4, through wires $a^3$ and $a^4$. Headlamps P are provided with lamps having each two filaments $rA$ and $rB$, both of these filaments being connected to the frame 23. In a similar manner, headlamps $p$ are provided with lamps of the same kind, but the sockets of these last mentioned lamps, instead of being connected directly to the frame of the vehicle, are insulated from said frame and are connected through wires $a^5$ and $a^6$ with the terminals of switch 20, the moving part of which is connected to the vehicle frame at 24. It is therefore clear that, according as switch 20 is in one or the other of its positions, one or the other of the auxiliary headlamps is switched on.

Now, it will be assumed, for instance as shown in Fig. 1, that switch 22 is on contact A, while switch 20 is on the contact corresponding to wire $a^5$ and the auxiliary headlamp on the left-hand side of the figure. Under these conditions, electric current from battery 25 is first fed to the filaments $r$A of headlamps P through the circuit shown in fine lines on the drawings as follows: point 3, point 1, wire $a^1$, filament $r$A, frame 23. On the other hand, the filament $r$A of the auxiliary headlamp $p$ on the left hand side is fed through the following circuit: Point 3, wire $a^3$, filament $r$A, wire $a^5$, switch 20, frame 24.

But account should be taken of the fact that, as the socket of the bulb of the auxiliary headlamp $p$ on the right-hand side is placed under tension through wire $a^3$ (since wire $a^6$ is insulated from the vehicle frame), the following circuits (shown in thick lines on the drawings) are also obtained:

(a) on the one hand, through the filaments of both headlamps $p$, the following circuit: battery 25, switch 22, point 3, wire $a^3$, filaments $r$A and $r$B of the headlamp $p$ on the right hand side, wire $a^4$, filament $r$B of the auxiliary projector $p$ on the left hand side, wire $a^5$, switch 20, frame 24;

(b) on the other hand, in shunt with the above stated circuit, the following circuit, point 4, point 2, filaments $r$B of both headlamps P, and frame 23.

It follows that both of the filaments of each bulb will always be under tension, which involves many serious drawbacks, and especially an exaggerated consumption of current.

The same phenomenons occur when switch 20, operatively connected with the steering gear, is in neutral position. Therefore current is always flowing through the filaments of the auxiliary head-lamps.

The chief object of the present invention is to obviate this drawback.

For this purpose, I provide, in the electric circuits, relays capable, while establishing the necessary connections, either of insulating the circuits of headlamps P from those of head-lamps $p$, or of insulating from each other the respective circuits of headlamps $p$, or again of producing any combination of circuits giving the desired result.

According to a first embodiment, shown by Fig. 2, I make use of a system of relays adapted to connect, with a point C of switch 22 directly connected with battery 25, one or the other of points 3 and 4 located on wires $a^3$ and $a^4$, and this without having current flowing through the wires that connect points 1 and 2 with points A and B.

For this purpose, I make use of two electro-magnets or relays 26 the coils of which are connected in series with the respective wires that connect points A and B with points 1 and 2, respectively. The armatures 27 of these electro-magnets serve to establish connections between one or the other of the points 3 and 4 and point C. These armatures, which constitute, for instance, circuit-breakers, may be subjected to the action of springs 28 which tend to normally open the circuits.

It results from Fig. 2 that, as soon as switch 22 is moved away from its neutral position so as to bring it onto either of contacts A and B, one or the other of the electro-magnets attracts its armature, so that one or the other of the wires $a^3$ and $a^4$ is placed under tension. But, in any case, wires $a^1$ and $a^2$ remain independent and no leakage current can flow through the filaments of head-lamps P.

Another embodiment is shown in Fig. 3. In this embodiment, I make use of only one electro-magnet 26, the winding of which is, for instance, inserted in series in the circuit of points A and 1 and the armature of which constitutes (or may operate) a circuit breaker having two positions.

These two positions are such that, for one of them, corresponding to the absence of current in the relay (switch 22 on point B or in neutral position), the point 4 of wire $a^4$ is connected with point C, so that the filaments $r$B are under tension.

For the other position, corresponding to the switch arm 22 being on contact A, the point 3 of wire $a^3$ is connected with point C.

In this embodiment, there must be provided a switch 29 for switching off headlamps $p$ during day time, that is to say when switch 22 is in neutral position.

The above described arrangements do not wholly eliminate leakage currents since, as shown by Fig. 1, they do not prevent, when one of the two auxiliary headlamps $p$ is switched on, current from flowing through both of the filaments of the other one.

I may, according to the present invention, provide a system of relays which eliminate also these leakage currents.

For this purpose, as shown in Fig. 2 for instance the armatures 27 of relays 26 are caused to operate circuit-breakers 51, 52 disposed on wires $a^3$, $a^4$, respectively. It will be readily understood that the insulation of both of the auxiliary projectors $p$ is obtained if circuit-breaker 51, controlled by the relay cooperating with contact B, is inserted in wire $a^3$, while circuit-breaker 52 is inserted in wire $a^4$.

The system according to the present invention as above stated operates in a manner which results clearly from the preceding explanations and need not be further described. Such a system has the advantage, over lighting systems existing prior to the present invention, of permitting a correct operation of the respective headlamps under all possible conditions.

Of course the means for operating switch 20, as a function of the pivotal displacement of the wheels of the vehicle for steering purposes, can be devised in any suitable manner. This switch may be actuated by any suitable part of the steering gear, as, for instance, by the steering wheel, in which case the elements of said switch may be carried by the steering wheel and a stationary wheel coaxial therewith, respectively.

The system above described may be associated with the following arrangements, which might also be employed separately, that is to say even in the case of the bulbs of the auxiliary head-lamps having each only one filament.

According to a feature of the invention, to be used in connection with lighting systems including two auxiliary headlamps such as p, I provide, for switching said headlamps on or off, at least one switch adapted to be operated by hand.

In the drawings, which represent systems including such a switch and a switch 20, automatically controlled through the steering gear, the manually operated switch is shown at 33.

Said switch 33, which is for instance connected to the terminals of switch 20, may be so arranged as to permit of switching on one or the other of headlamps p (Fig. 2). For this purpose it includes a movable part or arm 33, connected to the vehicle frame at 36, and two stationary contacts 34, 35, connected to the filaments of headlamps p, respectively, the whole being so devised that movable arm 33 can be brought upon one or the other of these contacts 34, 35.

Alternately, this switch 33 might be so arranged as to permit also simultaneously switching on both projectors, if it is desired to illuminate the whole width of the road in front of the vehicle.

Advantageously, when the vehicle is provided with devices for indicating the direction in which the vehicle is going to turn, the same switch may be utilized for switching on projectors p and for operating the elements of these indicating devices.

According to another feature of the invention, concerning, in a general manner, lighting systems of the kind above mentioned comprising in combination main headlamps and at least one auxiliary headlamp (if there is only one auxiliary headlamp, it is fitted in such manner as to illuminate the left hand side of the road in countries in which vehicles run along the right hand side of the road), I provide means for automatically switching on this auxiliary headlamp or headlamps when the vehicle is slowing down. This arrangement seems to be very useful for practical purposes since, except in the case of the vehicle negotiating a curve while running up a hill (and, as a matter of fact, in this case, the speed of the vehicle is relatively low, so that the problem of illuminating the road in front of the vehicle prior to turning the wheels for steering the vehicle along the curve is much less important), the driver is generally led to slow down when starting a curve, either by allowing the throttle pedal to move upwardly, or even by braking.

I may, for instance, make use of the movements of the throttle pedal for obtaining the automatic switching on above mentioned, and it has been assumed, in Fig. 4, that such an arrangement was applied to the case of two auxiliary headlamps (the main headlamps being not shown in this drawing). The wires $a^5$ and $a^6$ for connecting the filaments of these auxiliary headlamps to the vehicle frame are for instance respectively connected with two contacts 37 and 38 capable, when the throttle pedal is in its upper position, or close to this position, of being connected with said frame through a movable contact 39, itself connected with said frame at 40, and which is actuated in a suitable manner by the throttle pedal 47. With this arrangement, both of the auxiliary headlamps are simultaneously switched on.

If it is desired to obtain this switching on of the auxiliary headlamps only when the circuits are so connected as to feed current to one of the two filaments of each bulb, it suffices, for instance, to insert, in a wire 41 connecting the vehicle frame at 40 with movable contact 39, a switch associated with switch 22 and such that the current is allowed to flow through wire 41 when said switch 22 is on contact B. For this purpose, I provide, for instance, the movable arm of switch 22 with an insulated contact 42 capable of establishing an electrical connection between contacts 43 and 44, inserted in wire 41, when said movable arm is on contact B.

Also, a switch 45 is provided in wire 41, so as to permit of bringing out of action the arrangement just above described, but it should be well understood that the same function might also be performed for switch 22.

Finally, the whole may be devised in such manner that the filaments rB (reduced illumination) of the auxiliary headlamps are fed with current even when the filaments rA (full illumination) of the main headlamps are in service.

In any case, the device just above described makes it possible to illuminate the road before entering a curve; as soon as the wheels of the vehicle are pivoted for steering the vehicle along said curve, switch 20 is automatically brought into play.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a vehicle having a metallic frame, a lighting system which comprises, in combination, at least one main headlamp having two filaments both connected with said frame, two circuits, one for each of these filaments, a battery having one terminal connected with said frame, a switch for connecting the other terminal of said battery with one or the other of these two circuits, at least one auxiliary headlamp having two filaments, a wire connected to both of the two last mentioned filaments, a switch adapted to connect said wire with said frame, two circuits, one for each of the two last mentioned filaments, and means, operative by the first mentioned switch, for connecting one or the other of the two last mentioned circuits with said battery in such manner that current flowing through one of the two first mentioned circuits cannot flow through one of the two second mentioned circuits.

2. In a vehicle having a metallic frame, a lighting system which comprises, in combination, at least one main headlamp having two filaments both connected to said frame, two circuits, one for each of these filaments, a source of current having one terminal connected with said frame, a switch for connecting the other terminal of said source of current with one or the other of these two circuits, an auxiliary headlamp having two filaments, a wire connected to both of these last mentioned filaments, a switch adapted to connect said wire to said frame, two circuits, one for each of the two last mentioned filaments, wholly unconnected with the two first mentioned circuits, and at least one relay, operative by the current flowing through one of the two first mentioned circuits, for connecting one or the other of the two second mentioned circuits with said source of current.

3. In a vehicle having a metallic frame, a lighting system which comprises, in combination, at least one main headlamp having two filaments both connected with said frame, two circuits, one for each of these filaments, a source of current having one terminal connected to said frame, a switch for connecting the other terminal of said source of current with one or the other of these two circuits, an auxiliary headlamp having two filaments, a wire connected to both of the two last mentioned filaments, a switch adapted to connect said wire with said frame, two circuits, wholly unconnected with the two first mentioned circuits, each connecting one of the two last mentioned filaments with said source of current, these two last mentioned circuits being normally open, a relay electrically connected with one of the two first mentioned circuits adapted to close one of the two second mentioned circuits when current flows through said first mentioned circuit, and a relay electrically connected with the other of the two first mentioned circuits adapted to close the other of the two second mentioned circuits when current flows through said first mentioned circuit.

4. In a vehicle having a metallic frame, a lighting system which comprises, in combination, at least one main headlamp having two filaments both connected with said frame, two circuits, one for each of said filaments, a source of current having one terminal connected with said frame, a switch for connecting the other terminal of said source of current with one or the other of these two circuits, an auxiliary headlamp having two filaments, a wire connected to both of the two last mentioned filaments, a switch adapted to connect said wire with said frame, two circuits, wholly unconnected with the two first mentioned circuits, each connecting one of the two last mentioned filaments with said source of current, these two last mentioned circuits being normally open, a relay electrically connected with one of the two first mentioned circuits adapted to close one of the two second mentioned circuits when current flows through said first mentioned circuit, and to close the other of the two second mentioned circuits when no current flows through said first mentioned circuit.

5. A lighting system according to claim 4 in which this relay consists of an electro-magnet, including a coil inserted in series in one of the two first mentioned circuits, and an armature adapted to close one of said two second mentioned circuits when attracted by said coil, and elastic means for keeping said armature in a position in which it closes the other of said two second mentioned circuits, when no current flows through said coil, the system further including a switch for opening the last mentioned of the two second mentioned circuits.

6. In a vehicle having a metallic frame, a lighting system which comprises, in combination, at least one main headlamp having two filaments both connected to said frame, two circuits, one for each of these two filaments, a source of current having one terminal connected to said frame, a switch for connecting the other terminal of said source of current with one or the other of these two circuits, two auxiliary headlamps having each two filaments, a wire connected to both of the filaments of each of said auxiliary headlamps, a switch adapted to connect one or the other of said wires with said frame, a third circuit connected in parallel with one filament of one auxiliary headlamp and one filament of the other auxiliary headlamp, respectively, a fourth circuit connected in parallel with the other filament of one auxiliary headlamp and the other filament of the other auxiliary headlamp, both of these two last mentioned circuits being wholly unconnected with the two first mentioned circuits, at least one relay, operative by current flowing through one of the two first mentioned circuits for connecting the third or the fourth circuit with said source of current, and means, operative by said relay for opening that of the third and fourth circuits which is not connected with said source of current.

7. A lighting system according to claim 2 further including manually operable means for switching on and off said auxiliary headlamp.

8. In an automobile vehicle having speed control means, a lighting system which comprises, in combination, at least one main headlamp, at least one auxiliary headlamp, means operatively connected with the speed control means of the vehicles for automatically switching on said auxiliary headlamp when said speed control means are operated to produce a slowing down of the vehicle, and means, in series with said switching means, for switching on or off said auxiliary headlamp.

9. In an automobile vehicle having speed control means and steering means, a lighting system which comprises, in combination, at least one main headlamp, two auxiliary headlamps positioned one on each side of said vehicle respectively, means operatively connected with said speed control means for automatically switching on both of said auxiliary headlamps when said speed control means are operated to produce a slowing down of the vehicle, and means, operative by said steering means when the latter are operated to cause the vehicle to turn along a curve for switching on only one of said auxiliary headlamps.

10. In an automobile vehicle having speed control means and steering means, a lighting system which comprises, in combination, at least one main headlamp, two auxiliary headlamps positioned one on each side of said vehicle respectively, means operatively connected with said speed control means for automatically switching on both of said auxiliary headlamps when said speed control means are operated to produce a slowing down of the vehicle, and means operative by said steering means when the latter are operated to cause the vehicle to turn on one side for automatically switching on the auxiliary headlamp located on this side without acting on the auxiliary headlamp located on the opposite side.

HENRI MATHA.